United States Patent
Searcy et al.

(10) Patent No.: US 10,641,881 B2
(45) Date of Patent: May 5, 2020

(54) BI-STATIC RADAR SYSTEM

(71) Applicant: APTIV TECHNOLOGIES LIMITED, St. Michael (BB)

(72) Inventors: James F. Searcy, Westfield, IN (US);
Ryan K. Rossiter, Kokomo, IN (US);
Stephen W. Alland, Newbury Park, CA (US)

(73) Assignee: Aptiv Technologies Limited (BB)

( * ) Notice: Subject to any disclaimer, the term of this patent is extended or adjusted under 35 U.S.C. 154(b) by 439 days.

(21) Appl. No.: 15/204,056

(22) Filed: Jul. 7, 2016

(65) Prior Publication Data
US 2018/0024233 A1   Jan. 25, 2018

Related U.S. Application Data

(60) Provisional application No. 62/211,114, filed on Aug. 28, 2015.

(51) Int. Cl.
G01S 13/00  (2006.01)
G01S 7/03   (2006.01)
G01S 7/00   (2006.01)

(52) U.S. Cl.
CPC .......... G01S 13/003 (2013.01); G01S 7/006 (2013.01); G01S 7/032 (2013.01)

(58) Field of Classification Search
CPC ......... G01S 13/003; G01S 7/006; G01S 7/032
(Continued)

(56) References Cited

U.S. PATENT DOCUMENTS 4,021,804 A    5/1977  Dounce et al.
7,396,279 B2 * 7/2008  Berman .............. G07F 17/3244
                                                      463/16
(Continued)

OTHER PUBLICATIONS

S. Kong, S. Lee, C.-Y. Kim, and S. Hong, "Wireless cooperative synchronization of coherent UWB MIMO radar," IEEE Trans. Microw. Theory Tech., vol. 62, No. 1, pp. 154-165, Jan. 2014.
(Continued)

Primary Examiner — Timothy A Brainard
(74) Attorney, Agent, or Firm — Joseph V. Bonadies

(57) ABSTRACT

A bi-static radar system configured for coherent detection of a radar-signal includes a plurality of radar-transceivers, a controller, and a communications device. The plurality of radar-transceivers is characterized as physically spaced apart with respect to each other. The controller is in communication with the each of the radar-transceivers and is configured to coherently operate each of the radar-transceivers. The communications device communicates both a reference-clock signal and a frame-sync signal from the controller to each of the plurality of radar-transceivers whereby the plurality of radar-transceivers operate coherently. Alternatively, the system may include a reference-signal generator, a transmitter, and a plurality of receivers. The reference-signal generator generates a reference-signal characterized by a reference-frequency proportional to a fraction of a radar-frequency of a radar-signal transmitted. The transmitter generates the radar-signal at the radar-frequency based on the reference-signal. The plurality of receivers operates coherently to detect the radar-signal based on the reference-signal.

18 Claims, 6 Drawing Sheets

(58) Field of Classification Search
USPC .......................................................... 342/125
See application file for complete search history.

(56) References Cited

U.S. PATENT DOCUMENTS

| | | | |
|---|---|---|---|
| 7,800,453 B2 | 9/2010 | Milano | |
| 7,916,083 B2* | 3/2011 | Thiesen | H01Q 21/065 |
| | | | 342/372 |
| 9,735,881 B1* | 8/2017 | Agazzi | H04B 10/40 |
| 2003/0021241 A1* | 1/2003 | Dame | H04B 7/18506 |
| | | | 370/321 |
| 2006/0012511 A1 | 1/2006 | Dooi et al. | |
| 2006/0197701 A1* | 9/2006 | Heide | G01S 7/032 |
| | | | 342/118 |
| 2008/0036648 A1 | 2/2008 | Green et al. | |
| 2011/0043289 A1* | 2/2011 | Wan | H03L 7/081 |
| | | | 331/25 |
| 2012/0142280 A1 | 6/2012 | Banu et al. | |
| 2012/0188125 A1 | 7/2012 | Pomietlasz | |
| 2012/0321004 A1* | 12/2012 | Soul | H03J 7/04 |
| | | | 375/259 |
| 2013/0321198 A1 | 12/2013 | Park et al. | |
| 2014/0101351 A1* | 4/2014 | Hooper | G06F 13/42 |
| | | | 710/110 |
| 2016/0109559 A1* | 4/2016 | Delbecq | G01S 13/34 |
| | | | 342/170 |

OTHER PUBLICATIONS

R. Feger, C. Pfeffer, C. Schmid, M. J. Lang, Z. Tong, and A. Stelzer, "A 77-GHz FMCW MIMO radar based on loosely coupled stations," in Microwave Conference (GeMiC), 2012 The 7th German, Mar. 2012, pp. 1-4.

Andreas Frischen, Juergen Hasch, and Christian Waldschmidt, "Performance Degradation in Cooperative Radar Sensor Systems due to Uncorrelated Phase Noise", Proceedings of the 11th European Radar Conference, Oct. 2014, pp. 241-244.

* cited by examiner

US 10,641,881 B2

BI-STATIC RADAR SYSTEM

CROSS-REFERENCE TO RELATED APPLICATION

This application claims the benefit under 35 U.S.C. § 119(e) of U.S. Provisional Patent Application No. 62/211,114, filed Aug. 28, 2015, the entire disclosure of which is hereby incorporated herein by reference.

TECHNICAL FIELD OF INVENTION

This disclosure generally relates to a bi-static radar system.

BACKGROUND OF INVENTION

Bi-static radar is useful for various purposes, including improved probability of detection, formation of a larger antenna aperture through the combination of signals received from multiple radar-transceiver, etc. An important motivation for larger antenna aperture, and perhaps the primary motivation for coherent bi-static radar, is much improved angle capability (accuracy and discrimination). Coherent radar-transceiver operation will provide improved performance for bi-static radar compared to those operating with independent VCOs. A known method to make multiple homodyne receivers coherent is to distribute the Local Oscillator signal (LO) to each receiver for down conversion. However, at millimeter wave-length frequencies, this can be expensive or impractical when the receivers have significant separation. A known method for VCO control is a Fractional N PLL, in which the VCO frequency is divided and then compared to a reference oscillator. A known technique for generating frequency modulation of the VCO is for the divider in the Fractional N PLL to be varied over time. One example is a linear FM sweep. It is common that the reference oscillator for the Fractional N PLL is also used as a clock source to control frequency modulation and data acquisition with an ADC. Any difference in the time that the FM sweep is started in two sensors will appear as a range delay. This can be calibrated out through processing of received signals.

SUMMARY OF THE INVENTION

Multiple T/R Modules with independent VCOs are made to be coherent by controlling each of them with a separate Fractional N PLL, but with each of the Fractional N PLLs using a common reference clock signal. The data generated by these T/R Modules is combined in a coherent manner. The signals generated by these two VCOs have phase noise that is uncorrelated, but will not realize an accumulated phase error due to operation at independent frequencies. This reference clock also provides a common time base for frequency modulation control and ADC sampling. A common frequency modulation sequence can be implemented in the remote PLLs, but a timing synchronization signal is needed so that the sequence starts at the same time. Any difference in the start time for these waveforms will look like a range delay. This time difference can be determined by evaluating the signals measured by the two receivers, but it is desired that this time difference be consistent across coherent processing intervals. A Frame Sync signal is used to provide a timing reference to each radar module. This Frame Sync signal has consistent timing relative to the reference frequency to ensure all signals use the same reference clock pulse to start a modulation sequence. A possible method for distributing the reference and frame sync signal would be through an LVDS interface. A similar method for distributing a clock and frame sync signal has been developed to synchronize multiple image sensors so that the output of these sensors can be combined.

In accordance with one embodiment, a bi-static radar system configured for coherent detection of a radar-signal is provided. The system includes a plurality of radar-transceivers, a controller, and a communications device. The plurality of radar-transceivers is characterized as physically spaced apart with respect to each other. The controller is in communication with the each of the radar-transceivers. The controller is configured to coherently operate each of the radar-transceivers. The communications device is configured to communicate both a reference-clock signal and a frame-sync signal from the controller to each of the plurality of radar-transceivers whereby the plurality of radar-transceivers operate coherently.

In another embodiment, a bi-static radar system configured for coherent detection of a radar-signal is provided. The system includes a reference-signal generator, a transmitter, and a plurality of receivers. The reference-signal generator is operable to generate a reference-signal characterized by a reference-frequency that is proportional to a fraction of a radar-frequency of a radar-signal transmitted by the system. The transmitter is operable to generate the radar-signal at the radar-frequency based on the reference-signal. The plurality of receivers is operable to coherently detect the radar-signal based on the reference-signal.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
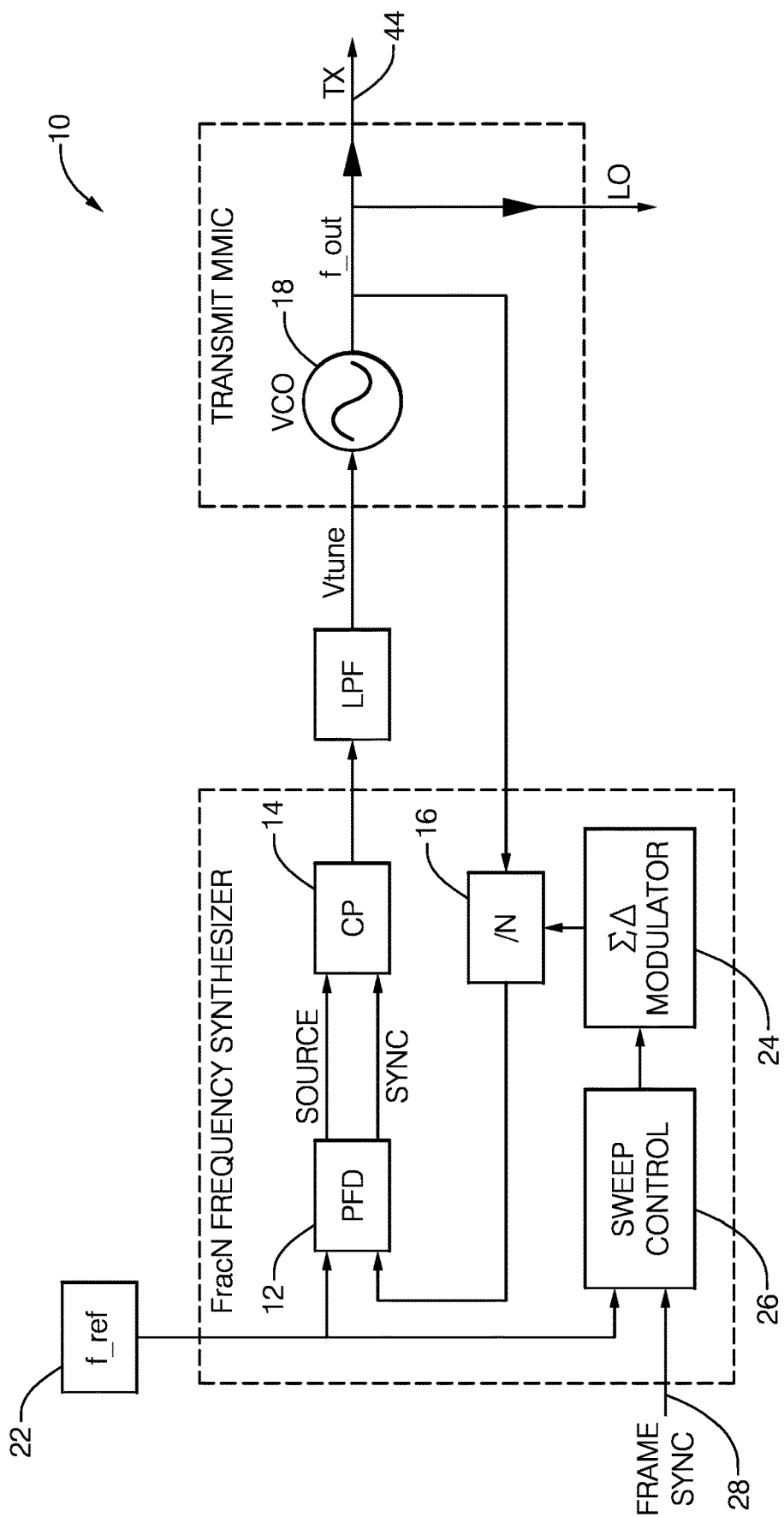
FIG. 1 is a diagram of bi-static radar system in accordance with one embodiment.

FIG. 1 illustrates a non-limiting example of a portion of a bi-static radar system, hereafter the system 10, which includes a phase-frequency detector, hereafter the PFD 12. The PFD 12 provides an output that controls or commands a charge-pump 14 (labeled CP) to either source or sink current, based upon edges received from the reference and VCO feedback signals. The block labeled '/N' is a divide-by-N divider, hereafter N-divider 16, which is used to divide down f_out which is the output of a voltage-controlled-oscillator 18 or VCO 18 that is feedback to the PFD 12. The phase-lock-loop (PLL) that includes the PFD 12 and the VCO 18 will try to lock the phase of the divided signal to a reference frequency (f_ref) output by a reference oscillator 22. The sigma delta (ΣΔ) modulator 24 varies the value of N that characterizes the operation of the N-divider 16 to provide various fractional divisor values. The output of a sweep-control 26 will vary the fractional N-divider value over time. The Frame Sync 28 is a timing signal used to initiate a modulation sequence in the sweep-control 26.

Figure 2:
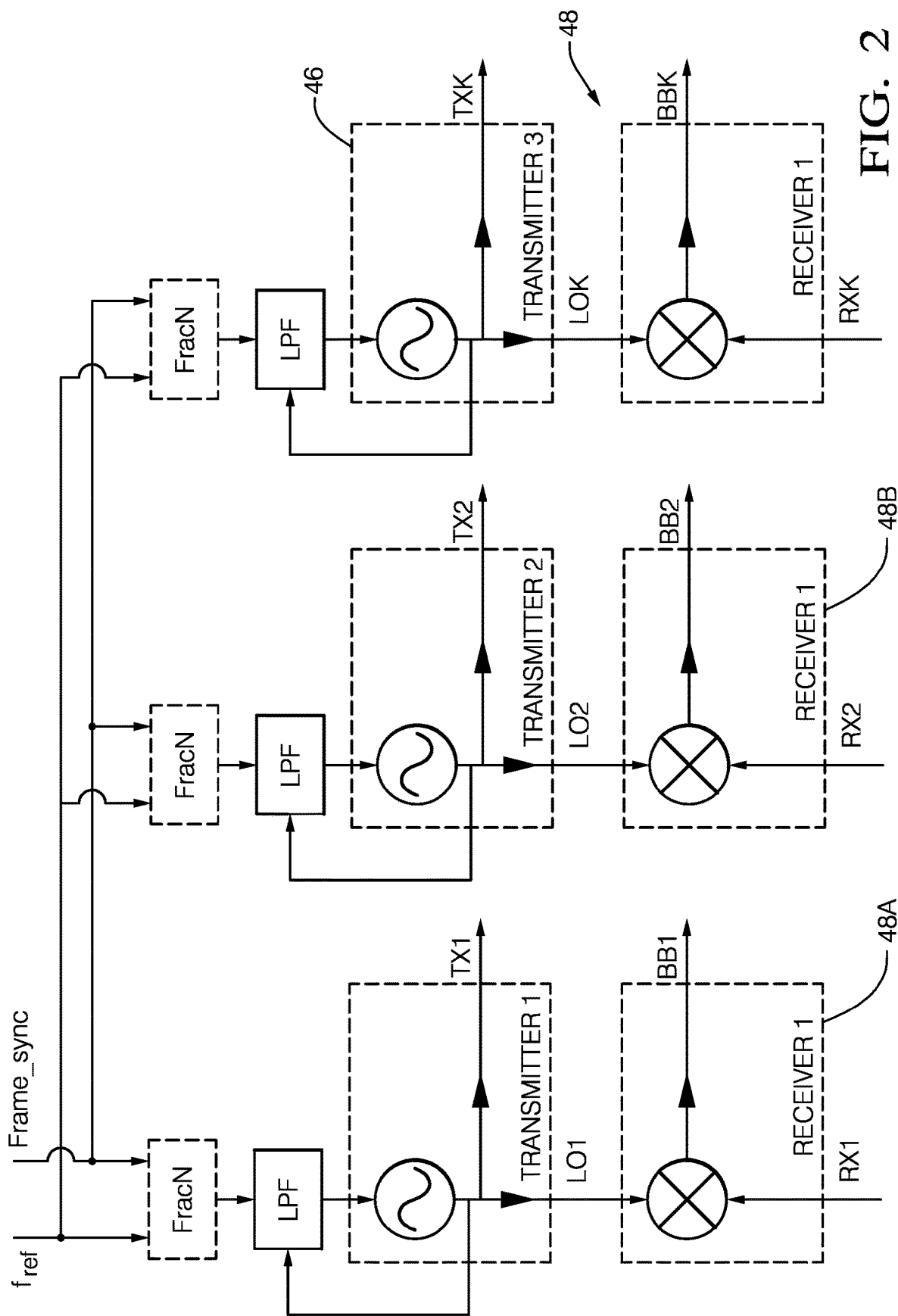
FIG. 2 is a diagram of bi-static radar system in accordance with one embodiment.

To adapt this functional diagram to multiple physically displaced apart radar-transceivers, and thereby avoid the problems of distributing radar frequency signals to physically displaced apart radar-transceivers (FIG. 2), a communications device 32 (FIG. 4) is needed to enable: Transmission of radar data from multiple radar sensors to some central location for coherent processing, Transmission of a reference clock to multiple radar sensors from some central location for use in a PLL, and Transmission of a frame sync to multiple radar sensors from a central location with a controlled latency, to allow for all radar sensors to generate the same waveform with a consistent time offset between radar signals. It is desired to have a consistent waveform phase between the radar signals. In the context of fast chirps, this means the same starting phase for each chirp, which is the general meaning of being 'coherent'.

Figure 3:
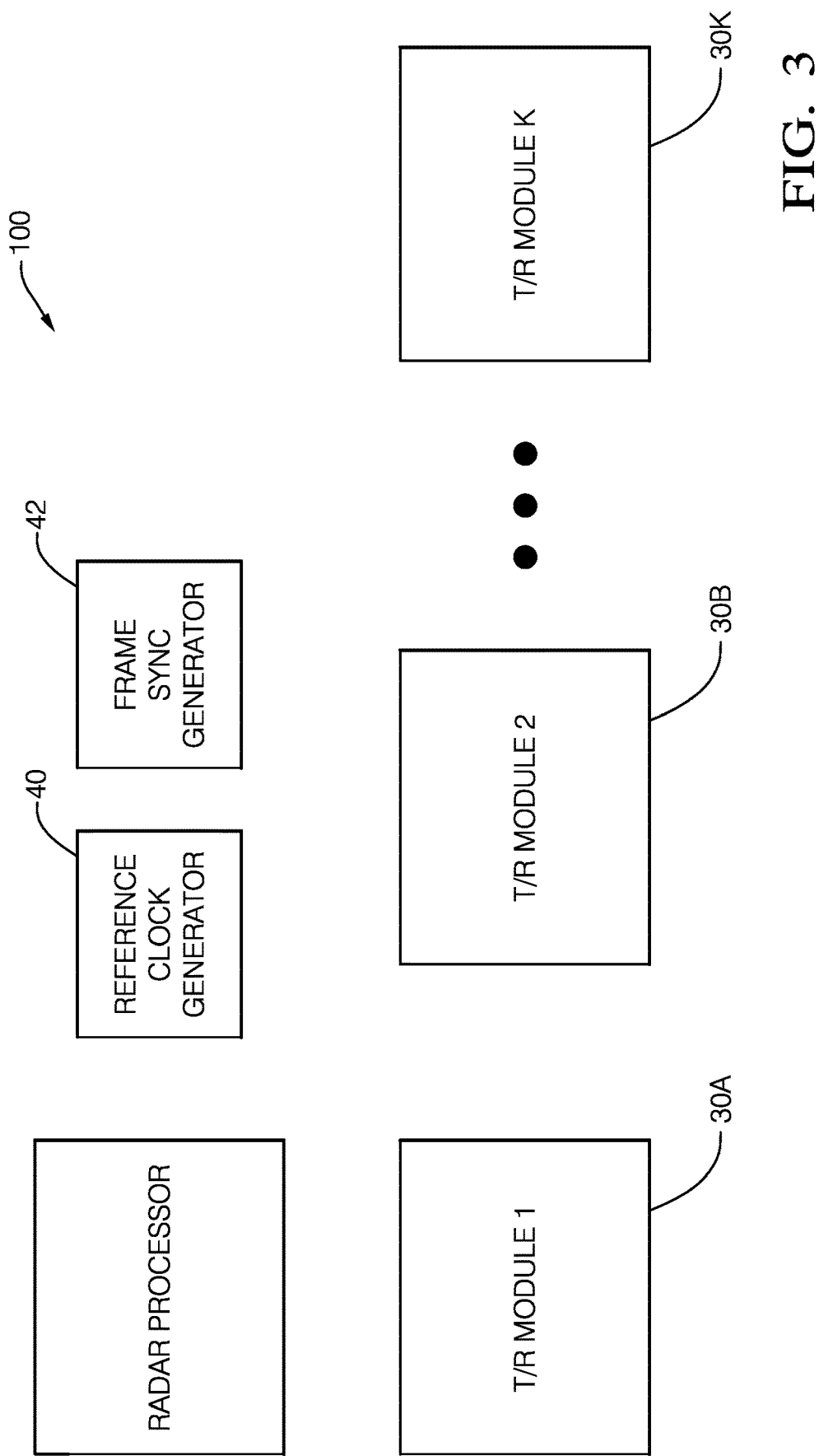
FIG. 3 is a diagram of bi-static radar system in accordance with another embodiment.

FIG. 3 illustrates non limiting example of a possible configuration 100 for multiple coherent receivers. Each transmit-receive (T/R) module that makes up a plurality of radar-transceivers 30A, 30B, . . . 30K (the value of K is understood to be variable) includes a VCO controlled by the fractional-N phase-lock-loop (Frac-N PLL) described in FIG. 1 which uses a Reference Clock signal as the input for the PLL control system and as the timing reference for frequency modulation. The FracN PLL also uses a Frame Sync signal to trigger a modulation sequence. Each T/R Module (radar-transceivers 30A, 30B, . . . 30K) includes at least one or more Transmit antennas and/or one or more Receive antennas. It is contemplated that in some cases a T/R module may have only receive-antennas and not transmit-antennas. When Transmit antennas are included, they are driven by the signal from the VCO. When Receive antennas are included, the VCO provides a reference for down-conversion to baseband. The baseband signal is digitized with an A to D converter, whose samples are either available for output directly, or available for some level of preprocessing. The output samples or preprocessed samples are known as the T/R Module Radar Data. The Reference Clock Generator provides a clock signal suitable for use by the Fractional N PLL. The Frame Sync Generator will provide a signal used to trigger the start of a modulation sequence. The Radar Processor has the capability to receive Radar Data from multiple T/R Modules and further process and combine the signals for coherent processing.

Figure 4:
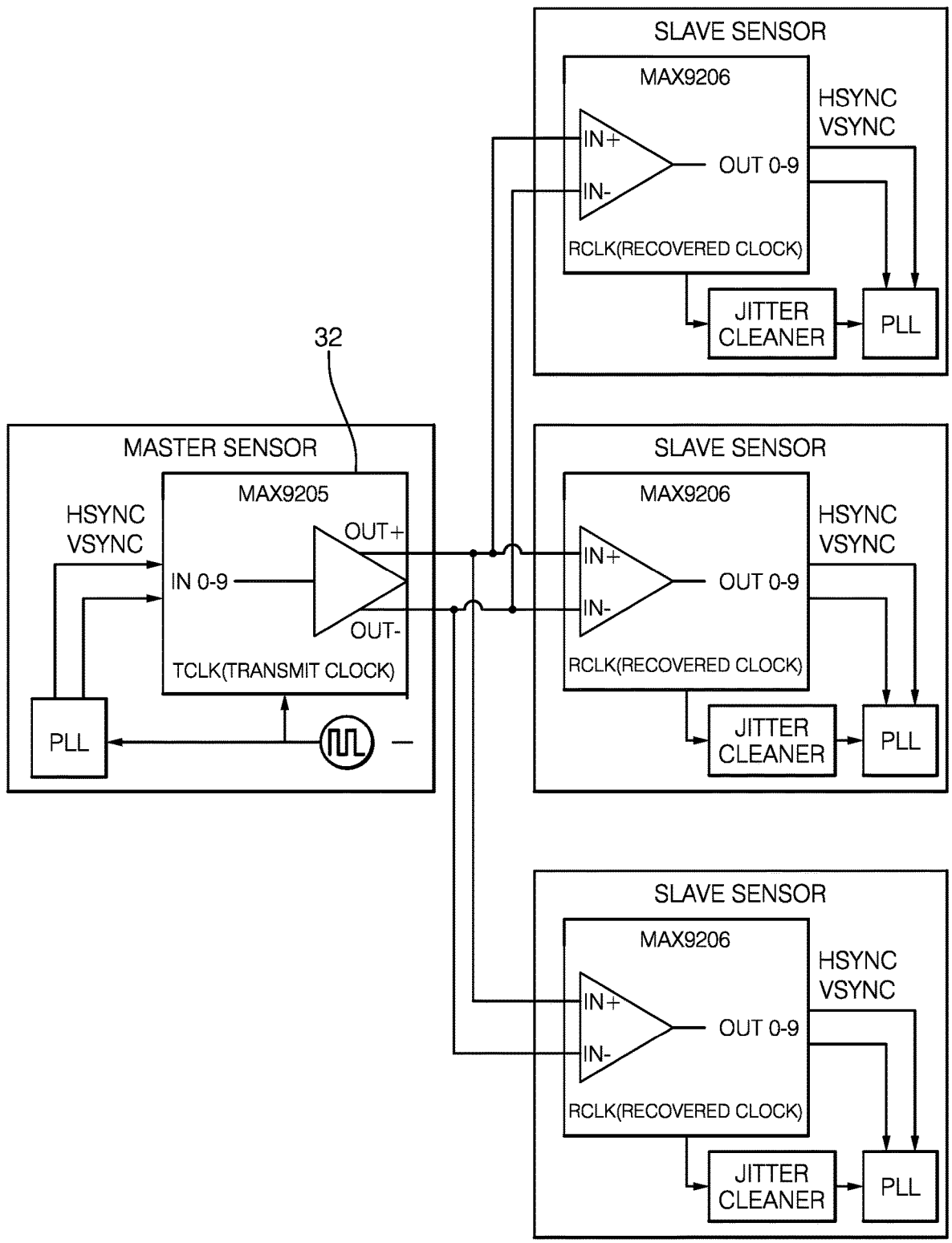
FIG. 4 is a diagram of bi-static radar system in accordance with another embodiment.

FIG. 4 illustrates a non-limiting example of a configuration that uses a combination of a Maxium 9205 and 9206 as the communications-device 32 to distribute a Reference Clock and Frame Sync information. An off-the-shelf Serializer/Deserializer chipset pair is used. Clock and Sync signals are captured, then serialized into high speed LVDS lane. Upon recovery, a clock jitter cleaner may be needed to provide adequate PLL performance.

Figure 5:
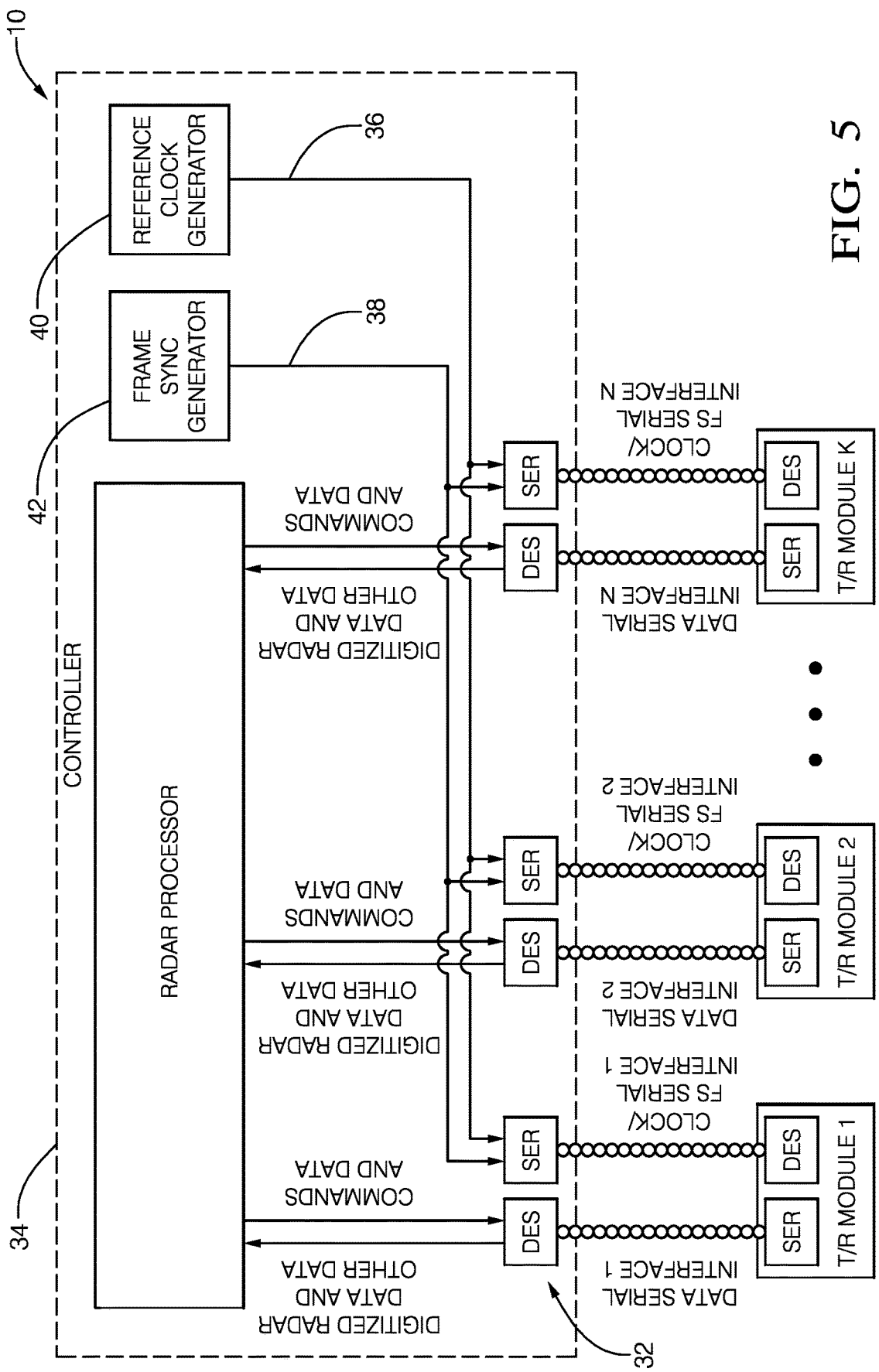
FIG. 5 is a diagram of bi-static radar system in accordance with another embodiment.

FIG. 5 illustrates another possible configuration (Configuration 1) of the system 10 with provisions for Clock and Frame Sync Distribution. The system 10 includes a controller 34 and a plurality of T/R modules, i.e. the plurality of radar-transceivers 30A, 30B, . . . 30K. The controller 34 includes the Frame Sync Generator, the Reference Clock Generator, and the Radar Processor. Each T/R module is connected to the controller 34 by a data serial interface, i.e. the communications device 32. Radar data is passed from the T/R module to the controller 34 on that interface. Some commands are sent from the controller 34 to the T/R module on the back channel of this serial interface. Each T/R module is also connected to the controller 34 by a second serial interface. Information on this serial interface from the controller 34 to each T/R module includes the Reference Clock and the Frame Sync. Information from each T/R Module contains Radar Data (provided that the T/R module includes radar data) and optionally other Data, such as Metadata about the Radar Data or the results of various diagnostic measurements. The Frame Sync that is received in each T/R module must have a controlled phase delay relative to the Reference Clock, such that each TR module will see an identical number of Reference Clock pulses between edges of the Frame Sync.

Figure 6:
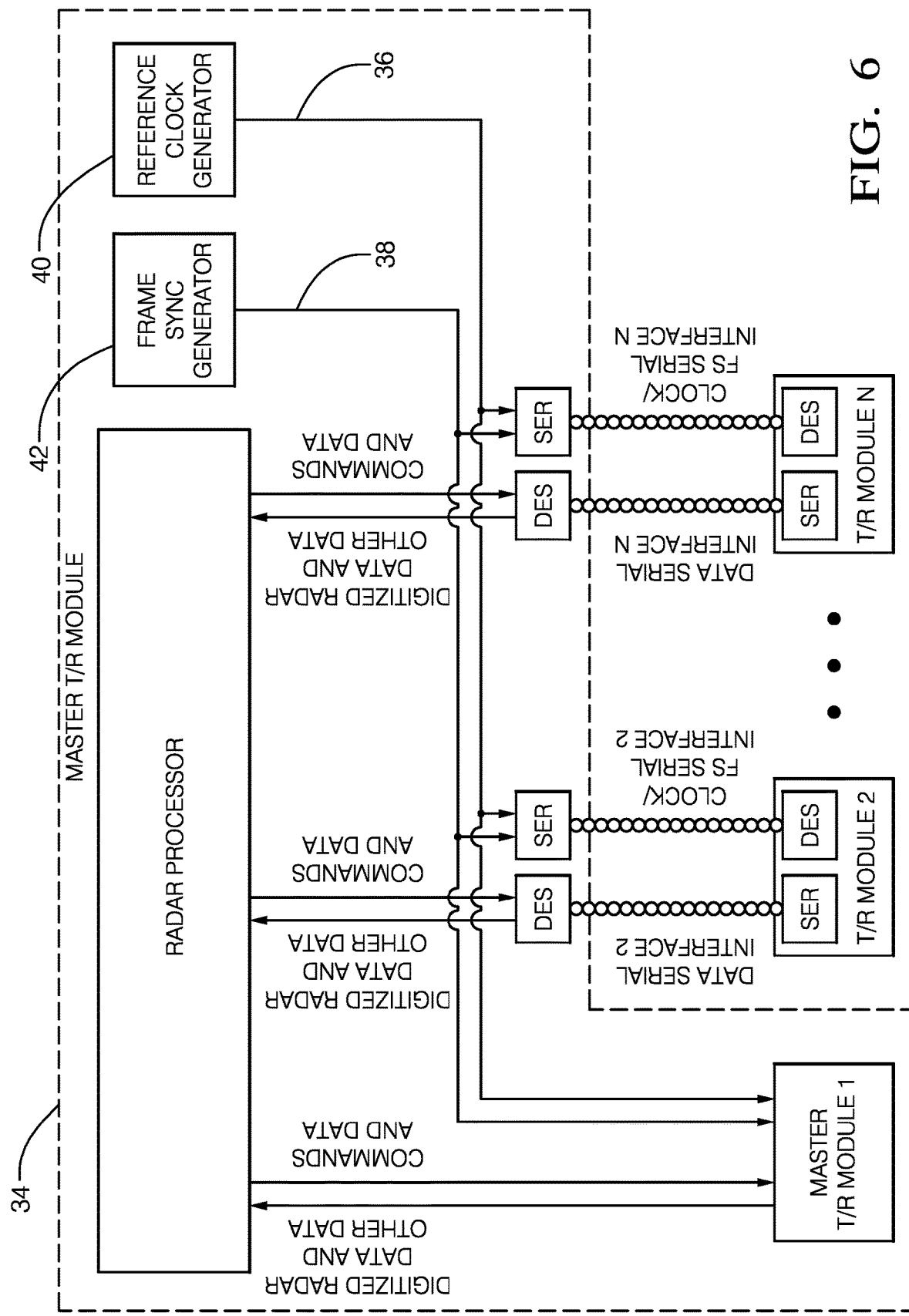
FIG. 6 is a diagram of bi-static radar system in accordance with another embodiment.

FIG. 6 illustrates another possible configuration (Configuration 2) of the system 10 referred to as a Master/Slave configuration that is the same as that shown in FIG. 5 except that in this non-limiting example the Master T/R Module includes the controller, the Radar Processor, the Frame Sync Generator, the Reference Clock Generator, and a T/R Module. This is known as the Master Module. The Master Module then communicates with one or more Slave Modules in a manner similar to the configuration shown in FIG. 5.

Another embodiment for Clock and Frame Sync Distribution in contemplated (Configuration 3: Independent Reference Clock and Frame Sync) where the Reference Clock Generator and Frame Sync Generator are located in a module separate from the Radar Processor and operate independently from the Radar Processor. Communication of these signals to the T/R Modules is performed via an interface separate from an interface for the Radar Data. The Radar Processor may communicate with the T/R Modules via a slower communication interface to coordinate measurement modes for each T/R Module.

Another embodiment for Clock and Frame Sync Distribution in contemplated (Configuration 4: Independent Communication Interfaces) that is similar to configuration 1 (FIG. 5), but instead of communicating the various signals on a single serial interface, the signals are separate into some combination of multiple serial interfaces.

Another embodiment for Clock and Frame Sync Distribution in contemplated (Configuration 5: Combining Radar Data, Commands, Reference Clock, and Frame Sync) where the contents of the Radar Data interface and the Reference Clock/Frame Sync interface are combined into a single bi-directional serial interface.

Accordingly, a bi-static radar system (the system 10), a controller 34 for the system 10, and a method of operating the system 10 is provided. The system 10 is configured for coherent detection of a radar-signal. The system includes a plurality of radar-transceivers 30A, 30B, . . . 30K. The plurality of radar-transceivers 30A, 30B, . . . 30K is characterized as physically spaced apart with respect to each other. As used herein, the radar transceivers are characterized as spaced apart when the distance is such that signals at typical radar-frequencies (e.g. 76 GHz) are not well communicated or propagated using simple wires or traces on a circuit board. For example, expensive wave-guides may be necessary when radar-transceivers are spaced apart, for example separated by five-hundred millimeters (500 mm). The controller 34 is in communication with the each of the radar-transceivers, said controller configured to coherently operate each of the radar-transceivers 30A, 30B, . . . 30K via the communications device 32 which is configured to communicate both a reference-clock signal or reference-signal 36 and a frame-sync signal 38 from the controller 34 to each of the plurality of radar-transceivers 30A, 30B, . . . 30K. Given these signals, each the plurality of radar-transceivers 30A, 30B, . . . 30K is able to operate coherently, i.e. in phase, with all other of the plurality of radar-transceivers 30A, 30B, . . . 30K.

As used herein, to operate coherently means the radar signals have a common phase reference or known phase relationship such that the radar processor can combine the radar signals as phasors (complex vectors) using their relative magnitude and phase. Radar signal coherency is typically achieved by using a common reference oscillator for transmit and receive. In the absence of a common phase reference or known phase relationship, the radar processor can only combine the radar signal signals non-coherently using just the magnitudes of the signals, not their phase.

Coherent operation of the plurality of radar-transceivers 30A, 30B, . . . 30K is advantageous because coherent radar signals can be combined to improve signal to noise ratio for better target detection as well as to resolve targets, in range, Doppler and angle. In contrast, radar processing of non-coherent signals (using only the magnitude of the signals but not their phase) improves target detection to a lesser extent and is not able to distinguish targets in range, Doppler, or angle.

In the context of a plurality of radar transceivers, coherent operation means all transceivers have a common time reference for synchronization of the transmit signals as well as a common phase reference for the transmit and receive signals. In this manner, the signals transmitted and received by each transceiver can be combined coherently in the radar processor to realize the advantages of coherent radar operation in target detection and resolution. When compared to coherent processing of the signals from only a single radar transceiver, coherent processing of signals from multiple radar transceivers spaced a distance apart extends the overall antenna dimension for substantially improved angle resolution.

The system 10 includes a reference-signal generator 40 (similar to reference-oscillator 22) operable to generate a reference-signal 36 characterized by a reference-frequency that is proportional to a fraction of a radar-frequency of a radar-signal 44 (f_out) transmitted by the system 10. The system includes at least one transmitter 46 that may be part of any one of the plurality of radar-transceivers 30A, 30B, . . . 30K. The transmitter 46 is generally operable to generate the radar-signal 44 at the radar-frequency based on the reference-signal 36. The system also includes a plurality of receivers 48 operable to coherently detect the radar-signal, and this coherent operation is based on or reference to the reference-signal. The plurality of receivers 48 that may be part of each of the plurality of radar-transceivers 30A, 30B, . . . 30K, which may include as a first receiver 48A and a second receiver 48B spaced apart from the first receiver 48A. By way of a non-limiting example, the first receiver 48A may be spaced apart from the second receiver 48B by more than five-hundred-millimeters (500 mm).

While this invention has been described in terms of the preferred embodiments thereof, it is not intended to be so limited, but rather only to the extent set forth in the claims that follow.

We claim:

1. A bi-static radar system configured for coherent detection of a radar-signal, said system comprising:
   a reference clock generator operable to generate a common reference clock signal at a reference-frequency;
   a plurality of receiver modules; and
   at least one fractional-N PLL associated with each of the plurality of receiver modules; wherein
      each fractional-N PLL is configured to generate a local clock signal independently for the respective receiver module based on the common reference clock signal, such that the bi-static radar system is operable to coherently detect a radar signal.

2. The system in accordance with claim 1, wherein the plurality of receiver modules includes a first receiver module and a second receiver module spaced apart from the first receiver.

3. The system in accordance with claim 2, wherein the first receiver module is spaced apart from the second receiver module by more than five-hundred-millimeters (500 mm).

4. The system in accordance with claim 1, wherein each fractional-N phase-lock-loop generates a local-oscillator signal at the radar-frequency based on the common reference clock signal.

5. The system in accordance with claim 4, wherein the local-oscillator signal used to coherently detect the radar-signal by the plurality of receivers.

6. The system in accordance with claim 1, wherein the system comprises:
   a plurality of transmitters, each one of the plurality of transmitters is associated with one of the plurality of receiver modules to form a plurality of radar-transceivers.

7. The system in accordance with claim 6, wherein each of the plurality of radar-transceivers includes a fractional-N phase-lock-loop.

8. The system in accordance with claim 7, wherein each fractional-N phase-lock-loop generates the radar-signal at the radar-frequency based on the common reference clock signal.

9. The system in accordance with claim 7, wherein each fractional-N phase-lock-loop generates a local-oscillator signal at the radar-frequency based on the common reference clock signal.

10. The system in accordance with claim 9, wherein the local-oscillator signal is used to coherently detect the radar-signal.

11. The system in accordance with claim 7, wherein each fractional-N phase-lock-loop:
   generates the radar-signal at the radar-frequency based on the common reference clock signal; and
   generates a local oscillator-signal at the radar-frequency based on the common reference clock signal, said local-oscillator signal used to coherently detect the radar-signal.

12. The system in accordance with claim 6, wherein the system comprises a plurality of serializer/deserializer chip-set pairs used to communicate the common reference clock signal to each of the plurality of radar-transceivers.

13. The system in accordance with claim 6, wherein the common reference clock signal is output by one of the of the plurality of radar-transceivers and communicated to the remainder of the plurality of radar-transceivers.

14. The system in accordance with claim 1, further comprising:
   a frame sync signal distributed to each fractional-N PLL.

15. The system in accordance with claim 14, wherein each fractional-N PLL uses the frame sync signal to trigger at least one modulation sequence.

16. The system of claim 1, wherein each of the plurality of receiver modules is a transceiver module that includes a transmitter.

17. The system of claim 16, wherein each fractional-N PLL is configured to generate a clock signal independently for the transmitter of the respective transceiver module.

18. A method, comprising:
generating, using a reference clock generator, a common reference clock signal at a reference-frequency; and
coherently detecting, using a plurality of receiver modules each associated with at least one fractional-N PLL, a radar-signal based on the common reference clock signal; wherein
each fractional-N PLL is configured to generate a local clock signal independently for the respective receiver module based on the common reference clock signal, such that the bi-static radar system is operable to coherently detect a radar signal.

* * * * *